Nov. 11, 1958 — H. D. EPSTEIN — 2,860,208
SNAP-ACTING THERMOSTAT ELEMENT
Filed March 28, 1955 — 3 Sheets-Sheet 2
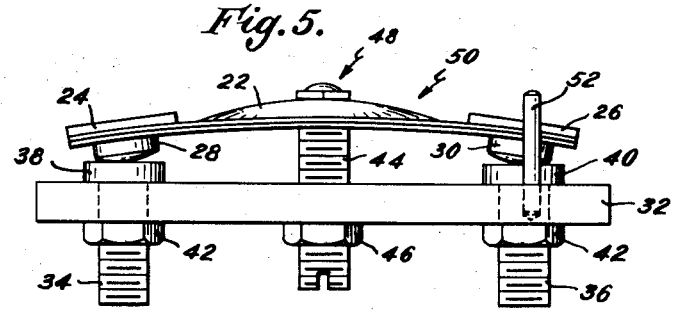
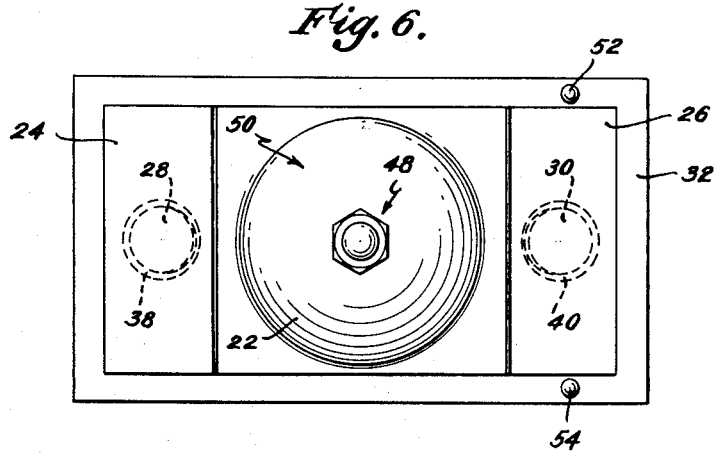
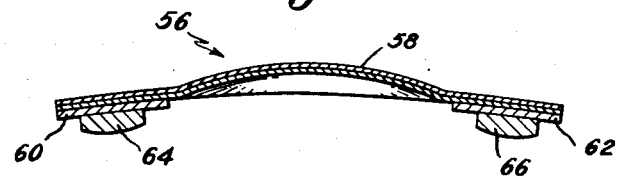
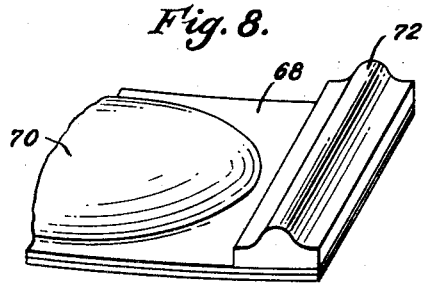
Inventor,
Henry David Epstein,
by Townsend M. Gunn
Atty.

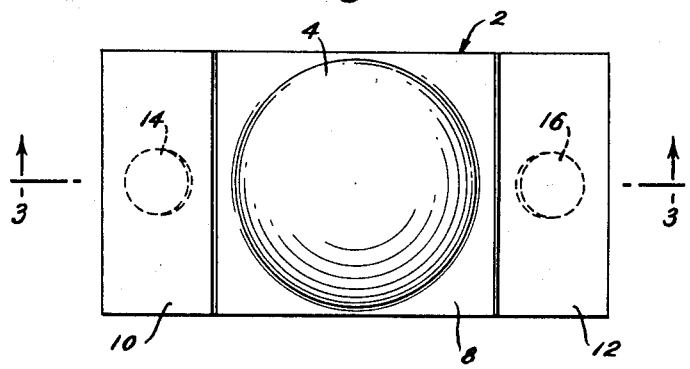
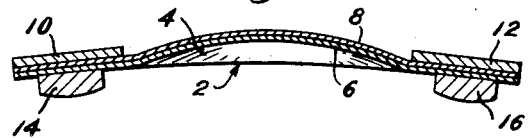
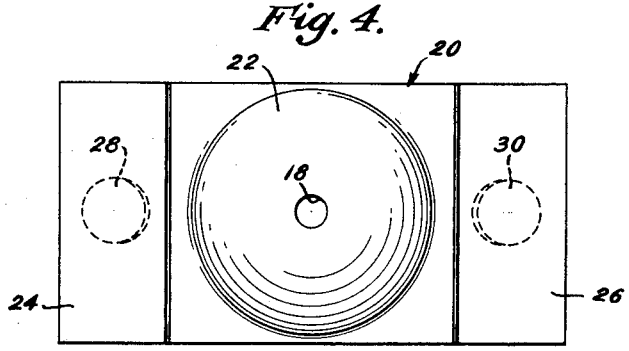
Inventor,
Henry David Epstein,
by Townsend M. Gunn
Atty.

Nov. 11, 1958 — H. D. EPSTEIN — 2,860,208
SNAP-ACTING THERMOSTAT ELEMENT
Filed March 28, 1955 — 3 Sheets-Sheet 3
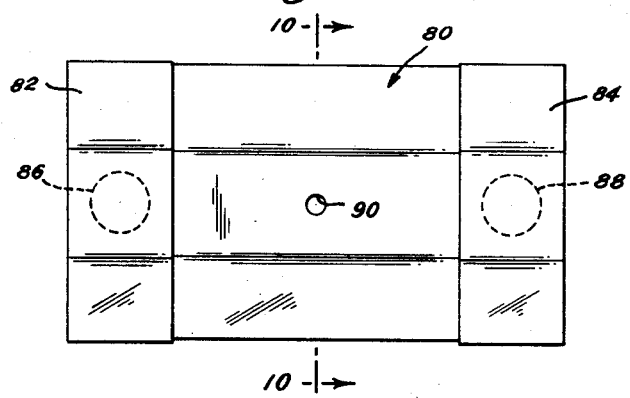
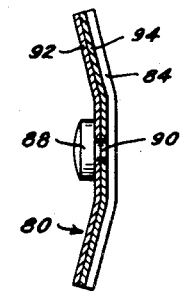
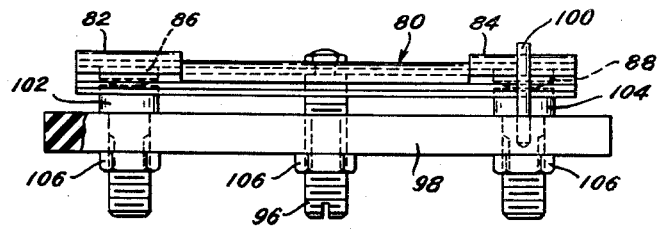
Inventor,
Henry David Epstein,
by Townsend M. Gunn,
Atty.

United States Patent Office 2,860,208
Patented Nov. 11, 1958

2,860,208

SNAP-ACTING THERMOSTAT ELEMENT

Henry David Epstein, Boston, Mass., assignor to Metals & Controls Corporation, Attleboro, Mass., a corporation of Massachusetts Application March 28, 1955, Serial No. 497,109

14 Claims. (Cl. 200—113)

This invention relates to snap-acting thermostatic elements, and in particular to such elements which are inherently snap-acting.

Among the several objects of the invention may be noted the provision of a snap-acting thermostatic element of improved shape which is able to withstand the passage of relatively large electrical currents therethrough without burning out.

Another object of the invention is the provision of an inherently snap-acting element in which means are provided to direct the flow of current therethrough in predetermined paths.

Another object of the invention is the provision of a snap-acting element so designed that when traversed by electrical currents, the current density in all portions is substantially the same.

A still further object of the invention is the provision of a thermostatic snap-acting element in which at each end of the element an equi-potential line exists running across the width of the element when current flows through the element.

A final object of the invention is the provision of snap-acting elements of the above general types which are economical and simple to make and use.

One of the problems encountered in the use of many small inherently snap-acting thermostatic elements used today in small circuit breakers for automotive vehicles and aircraft, is that of having the thermostatic element function satisfactorily under normal overloads, and not become damaged by excessive current overloads to the point of becoming either inoperative or de-calibrated. In general, the current into and out of such circuit breakers is led into and out of the snap-acting element thereof at isolated points, such as by means of electrical contacts which are electrically attached to the thermostat element. Under normal short circuit conditions, the current values which exist in the thermostat element during the length of time that its motion is utilized to interrupt the circuit, are not large enough to overheat it deleteriously. However, under excessive values of short circuit currents, the flow of current through the element tends to be concentrated by the isolated positioning of the aforementioned contacts in such a way that localized overheating can take place. This localized overheating oftentimes is so great as either to change the calibration of the element, or in some cases even to melt portions of the snap-acting element and thereby completely ruin the element and the switch with which it is associated.

It is the general purpose of this invention to provide a snap-acting element and a simple switch using such an element, which solves the above problem.

In the accompanying drawings, in which several of various possible embodiments of the invention are illustrated:

Fig. 1 is a plan view of one embodiment of this invention;

Fig. 2 is a side view of the Fig. 1 embodiment;

Fig. 3 is a cross section of the Fig. 1 embodiment taken in the direction of sight lines 3—3 thereon;

Fig. 4 is a plan view of another embodiment of this invention;

Figs. 5 and 6 are side and plan views, respectively, of a simple switch incorporating the Fig. 4 snap-acting element;

Fig. 7 is a cross sectional view of a third embodiment of the invention;

Fig. 8 is a perspective view, showing a fourth embodiment of the invention, only a portion thereof being illustrated;

Fig. 9 is a plan view of another embodiment of the invention;

Fig. 10 is a cross section of the Fig. 9 embodiment taken in the direction of sight lines 10—10 thereon; and Fig. 11 is a side view of a simple switch embodying the Fig. 9 embodiment.

Similar reference characters indicate corresponding parts throughout the several views of the drawings.

The invention accordingly comprises the elements and combinations of elements, features of construction, and arrangements of parts which will be exemplified in the structures hereinafter described, and the scope of the application of which will be indicated in the following claims.

In the present invention, the aforementioned problem is solved by providing a symmetrical structure such that with current flowing therethrough, an equipotential line extends across the thermostatic element at each end with the result that every portion of the thermostat element has substantially the same current density. This avoids the aforementioned localized heating, and consequently the thermostat element can withstand much greater currents than previously known elements of similar size, without harm.

In addition, the structure is such that that portion of the thermostat element which gives it snap action when heated, is heated uniformly and is at all times heated as hot or hotter than other parts of the device.

Referring now to Fig. 1, the thermostat element shown therein comprises the rectangularly shaped sheet 2 of thermostat metal having its central portion 4 dished or deformed as shown to make the element snap-acting in the well-known manner. It is believed that the action under the influence of heat of such a snap-acting device is well enough understood without any lengthy explanation. However, the following brief explanation will be of assistance. Assuming that the element is at room temperature, and looking at the Fig. 2 illustration, the high expansion side 6 of the thermostat metal is on the inside of the dished portion 4 and the low expansion side 8 is on the outside. When, now, such an element is heated, the forces engendered by the differences in expansion of the components 6 and 8 try to cause the thermostat element to bend into a position of opposite curvature. However, this attempt is resisted by the arch of the dished portion 4 until such a point is reached that the forces tending to reverse the arch exceed the mechanical forces tending to keep it in its Fig. 2 position. Immediately, the dished portion 4 will then reverse its curvature with a sudden snap. Upon cooling, the reverse procedure takes place.

Across each end of the thermostatic sheet 2 is attached a piece of material having a high electrical conductivity as compared to the conductivity of the thermostat metal itself. These current distributing bars or strips are numbered 10 and 12 and can be made of brass, or copper, or silver, for example. In the particular device shown in Figs. 1–3, exemplary characteristics are as follows: The total length of the thermostat element shown is approximately 1 3/16 inch. Its width is approximately 9/16 inch. Each of the conducting strips 10 and 12 is approximately 7/32 inch wide and .020 inch thick, and is made of brass having a specific resistivity of approximately 38 ohms per circular mil foot. The thermostat metal 2 is approximately .008 inch thick and has a specific resistivity of 470 ohms per circular mil foot. It is to be observed that the conductivity of each of the conducting strips 10 and 12 is thus about 30 times greater than the conductivity of the thermostat metal.

The attachment of strips 10 and 12 to the thermostat element 2 may be done by a brazing operation, or by seam welding. The important and critical thing is that a good electrical connection be made between each of the strips and the thermostat metal on which it rests out to the very ends of the conducting tsrips and over as much of the mating areas as possible.

(In the drawings, the thicknesses of the conducting strips and the thermostat metal have been greatly exaggerated for the purposes of illustration).

At each end of the thermostat element is attached a contact, numbered 14 and 16, respectively. It is preferred, for reasons of symmetry and the resulting symmetrical operation of the device, that these electrical contacts be placed approximately on the mid-line of the thermostat element. However, if the design and use of the thermostat element in an electrical switch requires that the electrical contacts be placed asymmetrically with regard to the center line of the thermostat element, this can be done without harmful effect on the operation of the device because of the high conductivity of the conducting elements 10 and 12 with regard to the thermostat material 2. The contacts may be attached to the conducting strips either by welding or by brazing, and in the illustration they are attached by brazing so that the entire back surface of the electrical contact is in electrical engagement with the conducting strip. Thus a low electrical resistance engagement of each contact with its respective current distributing bar is realized.

It will now be observed that with the above-described construction and the relationship of the conductivities of the conducting strips 10 and 12 and the thermostat metal 2, the strips 10 and 12 are the loci of substantially equipotential lines across the ends of the element 2 when current is flowing. The result of this is that current flowing through the thermostat element and consequently through the dished area 4 from, say, conducting strip 10 to conducting strip 12, will be uniform. That is, every portion of the thermostat material which lies between the conducting strips will have substantially the same current density. Therefore, except for slight differences due to edge effects, every portion of the snap-acting part of the thermostat metal thus included between the conducting strips 10 and 12 will be heated substantially the same and as hot as or hotter than other portions of the element during short-circuit conditions. The result is that the heating of the dished or snap-acting portion (which is the motivating portion) never develops localized hot spots and never lags behind the heating of the rest of the thermal element. This gives maximum efficiency of operation, and inhibits change of calibration and burn-out.

The preferred form of the invention is that shown in Figs. 1–3, and it will be observed that no center mounting hole is provided for the element. This is done to maintain the uniform distribution of current. The element can be mounted by clamping the center of the dished portion between two abutments, thus allowing the ends of the element to move freely to actuate the contacts 14 and 16; or one end of the element may be fixed to a stationary electrical terminal, leaving the other end of the thermostat element free to snap toward and away from a mating stationary electrical terminal to make and break an electrical circuit.

However, if desired, a relatively small mounting hole can be provided at the center of the snap-acting element, and this embodiment is shown in Fig. 4. The Fig. 4 embodiment is exactly like the Fig. 1 embodiment except for the provision of the center mounting hole 18. This embodiment has the sheet metal thermostat body 20, the snap-acting central dished portion 22, the conducting strips 24 and 26, and the electrical contacts 28 and 30, all as provided in the Figs. 1–3 embodiment.

Referring now to Figs. 5 and 6, the Fig. 4 embodiment is shown applied in a simple circuit breaker. A base 32 of electrical insulating material such as Bakelite, or other molded synthetic resin or (if desired) a ceramic material, is provided, and has mounted thereon the screw-type stationary terminals 34 and 36, these terminals carrying at their upper ends the stationary electrical contacts 38 and 40. Lock nuts 42 clamp these terminals and their associated contacts firmly to the base 32. A central mounting post 44 is provided which adjustably threads into the base 32, and is held in an adjusted position by means of the lock nut 46. Mounted on the top of screw 44 by the well-known shouldered abutments and washer construction indicated generally by numeral 48 is a snap-acting element of the Fig. 4 type indicated generally by numeral 50. This element carries the afore-mentioned electrical contacts 28 and 30 which engage respectively the stationary electrical contacts 38 and 40. In order to keep these contacts aligned, the two guide posts 52 and 54 are provided, these being mounted in any well-known way in the base 32.

Referring now to Fig. 7, there is shown a third embodiment of the invention which again is like the Fig. 1–3 embodiment, except that in this case the conducting strip is placed on the electrical contact side of the thermostat element. The element has the main body portion 56 shaped as is sheet 2 of the Fig. 1 embodiment, and the central dished area 58 just as described above. The conducting strips 60 and 62 run, as before, the entire width of the thermostat material and are firmly attached thereto mechanically and electrically as described above. Attached to the conducting strips 60 and 62, are respectively, the electrical contacts 64 and 66. This device, like those heretofore described, may be used in electrical switches such as are generally shown in Figs. 5 and 6 embodiment, or, as mentioned in connection with the Fig. 1 embodiment, the electrical contact 64 (for example) could be eliminated and this end of the thermostat element used to fasten the element to the base of the switch, leaving contact 66 free to snap toward and away from its mating stationary contact.

In all of the above embodiments, the electrical contact has been shown as being separately fastened to the respective conducting strip. However, the conducting strip and electrical contact can be made as a single entity and this is shown in Fig. 8 as a fourth embodiment. Again the rectangular strip of thermostat metal 68 is shown having the dished snap-acting central portion 70. (In this drawing, only one end of the element is shown since the other end is exactly like the one shown.) The bar-contact 72 is made of a high electrical conducting material such as copper, brass or silver, and has its surface attached to the thermostat material across the entire width thereof, as described for the above embodiments. If the contact 72 is made of silver, it can be of solid silver as shown, or it can be made of composite material in which the backing layer is a base metal and the contact face is silver. Similarly, if copper and brass are used, it may be found preferable to make the actual contact face of silver. The Fig. 8 device functions just as do the other embodiments already described.

Referring now to Fig. 9, there is shown a fifth embodiment of the invention, which comprises a sheet of thermostat metal 80 which this time is formed as a shallow channel throughout its length, such a channel having the property of changing its shape with a snap action. Attached (as described for plates 24 and 26)

to each end of this sheet are the current distributing plates 82 and 84. The electrical contacts 86 and 88 are also attached as shown, by welding so as to be in intimate low electrical resistance engagement with bars 82 and 84, respectively. A mounting hole 90 may be provided, or the device may have no mounting hole and be mounted as described for the Fig. 1 embodiment. As illustrated in Fig. 10, the bimetal sheet has a high expansion side 92 and a low expansion side 94, with the high expansion side 94 being on the inside of the channel when the thermal element is cold and is of the type that will snap when it is heated.

Referring now to Fig. 11, a simple switch is shown which uses the snap-acting plate of Fig. 9. Plate 80 is mounted (as is described for the Figs. 5 and 6 embodiment) by means of the adjusting post 96, which is threadably fitted into the base of electrical insultating material 98. The plate 80 is held to the top of the adjusting post 96 by means of the conventional shoulder and abutment construction so as to permit the mounting screw 96 to be turned relative to the plate 80 for purposes of adjustment. Guide rods 100 are provided as in the previous embodiments to prevent misalignment of the contacts. The pair of stationary contacts 102 and 104 are provided, as described in the other embodiments, and these contacts mate respectively with contacts 86 and 88 to make and break an electrical circuit. The stationary contacts and the adjusting post are held fixed in the base (after adjustments have been made) by means of the lock nuts 106.

Temperature adjustment of the plate is made by turning the adjusting post 96 to depress the center of the plate against the restraint of the mating contacts. The more the plate is depressed (once the snapping temperature has been reached), the lower the temperature at which the device will snap. In all respects, the operation of this embodiment in respect to current flow, heating, burnout, etc., is the same as the previously-described embodiments.

In the above description of Figs. 9, 10 and 11, the word "channel" is used in a generic sense to include (without limiting its generality) the flat-bottomed V-shape of Figs. 9, 10 and 11 as well as a shallow V-shape and a section of a cylindrical surface.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A snap-acting thermostat element comprising a sheet of thermostat metal; a pair of metal bars of electrically conductive metal, each of said bars being fastened to said sheet entirely across the width of said sheet to provide an electrically low resistance connection between each of said bars and the portion of the sheet to which each bar is fastened, the electrical conductivity of the metal of said bars being greater than the electrical conductivity of said thermostat metal; and the portion of said sheet lying between said bars being of substantially uniform width, said last-mentioned portion of said sheet being provided with a deformation capable of changing its shape suddenly with a snap motion due to change in temperature thereof upon the flow of electrical current through said last-mentioned portion of the sheet.

2. A snap-acting thermostat element comprising a sheet of thermostat metal; a pair of spaced metal bars of electrically conductive metal, each of said bars being fastened to said sheet entirely across the width of said sheet to provide an electrically low resistance connection between each of said bars and the portion of the sheet to which each bar is fastened, the length of each bar being substantially perpendicular to the length of the said sheet, the specific electrical conductivity of the metal of each bar being greater than the electrical conductivity of the said thermostat metal; and the portion of said sheet lying between said bars being of substantially uniform width, said last-mentioned portion of said sheet being provided with a deformation capable of changing its shape suddenly with a snap motion due to change in temperature thereof upon the flow of electrical current through said last-mentioned portion of the sheet.

3. The snap-acting element of claim 2 in which each of said bars has at least its face portion made of electrical contact metal, said face portion having at least a portion thereof shaped to form a contact face adapted to cooperate with another electrical contact.

4. A snap-acting thermostat element comprising a sheet of thermostat metal; a pair of spaced metal bars of electrical conductive metal, each of said bars being fastened to said sheet entirely across the width of said sheet to provide an electrically low resistance connection between each of said bars and the portion of the sheet to which each bar is fastened, the length of each bar being substantially perpendicular to the length of said sheet, the specific electrical conductivity of the metal of each bar being greater than the electrical conductivity of the said thermostat metal; an electrical contact disposed in a low resistance electrical engagement with each of the respective bars; and the portion of said sheet lying between said bars being of substantially uniform width, said last-mentioned portion of said sheet being provided with a deformation capable of changing its shape suddenly with a snap motion due to change in temperature thereof upon the flow of electrical current through said last-mentioned portion of the sheet.

5. The snap-acting element of claim 4 in which each of said bars lies on the same side of said sheet, and each of said contacts lies on the opposite side of said sheet.

6. The snap-acting thermostat element of claim 4 in which each of said bars and said electrical contacts lies on the same side of the sheet, said electrical contact being superimposed upon and engaged with its respective bar.

7. A snap-acting thermostatic switch comprising a base, a pair of stationary contacts mounted immovably on said base, mounting means provided on said base, and a snap-acting thermostat element mounted on said mounting means, said snap-acting thermostat element comprising a sheet of thermostat metal; a pair of metal bars of electrically conductive metal, each of said bars being fastened to said sheet entirely across the width of said sheet and in substantially parallel relationship to the other bar, each of said bars being perpendicular to the length of said sheet, and the electrical conductivity of the metal of said bars being greater than the electrical conductivity of said thermostat metal, each bar being bonded to and in low resistance electrical conduction with said sheet throughout substantially the entire length of each bar; contact means provided with respect to each bar at each end thereof and engaging said stationary contacts when the switch is in its closed position; guide means on said base for maintaining said contacts in alignment; and the portion of said thermostatic sheet lying between said bars being of substantially uniform width, said portion of said sheet being provided with a deformation capable of changing its shape suddenly with a snap motion due to change in temperature thereof upon the flow of electrical current through said last-mentioned portion of the sheet.

8. The snap-acting switch of claim 7 in which each of said bars has at least its face portion made of electrical contact metal, said face portion having at least a portion thereof shaped to form a contact face adapted to co-operate with said stationary contacts.

9. The snap-acting switch of claim 7 in which each of said bars is mounted on one side of said sheet, and in which a movable contact is fastened to each of said bars in a low resistance electrical engagement with its respective bar, each of said contacts co-operating with its mating stationary contact.

10. A snap-acting thermostat element comprising a sheet of thermostat metal; a pair of spaced metal bars of electrically conductive metal, one each fastened in electrically low resistance connection to said sheet entirely across the width of said sheet in substantially parallel relationship to the other, the length of each bar being substantially perpendicular to the length of said sheet, the portion of said sheet lying between said bars being of substantially uniform width, the specific electrical conductivity of the metal of each bar being greater than the electrical conductivity of the said thermostat metal; said sheet being deformed along its length in the form of a shallow trough, each of said bars likewise being bent to conform to the shape of said thermostat metal, and said shallow trough being capable of changing its shape suddenly with a snap motion due to change in temperature thereof upon the flow of electrical current through said last-mentioned portion of the sheet.

11. The snap-acting element of claim 10 in which each of said bars has at least its face portion made of electrical contact metal.

12. The snap-acting element of claim 10 in which each of said bars has at least its face portion made of electrical contact metal, said face portion having at least a portion thereof shaped to form a contact face adapted to co-operate with another electrical contact.

13. The snap-acting element of claim 10, including an electrical contact disposed in a low resistance electrical engagement with the respective bar at each end.

14. A snap-acting thermostatic switch, comprising a base, stationary contacts mounted on said base, a mounting post mounted on said base between said stationary contacts, a snap-acting thermostatic element mounted on top of said mounting post and comprising a rectangular shaped sheet of thermostat metal, and means mounted on said thermostat metal for causing current conducted from one end of said sheet to the other end of said sheet to flow with uniform density, and electrical contact means electrically in engagement with each end of said sheet and co-operating with said stationary contacts to make and break an electrical circuit, at least a portion of said sheet of thermostat metal being provided with a deformation capable of changing its shape suddenly with a snap motion due to change in temperature thereof upon the flow of electrical current through said last-mentioned portion of the sheet.

References Cited in the file of this patent

UNITED STATES PATENTS

| | | |
|---|---|---|
| 1,687,664 | Greenawalt | Oct. 16, 1928 |
| 1,809,304 | Matthews | June 9, 1931 |
| 2,285,624 | Tanner | June 9, 1942 |
| 2,465,230 | Hodgkins | Mar. 9, 1949 |
| 2,564,931 | Smith | Aug. 21, 1951 |
| 2,587,789 | Talmadge et al. | Mar. 4, 1952 |
| 2,651,748 | Talmadge et al. | Sept. 8, 1953 |